United States Patent [19]

Welter et al.

[11] Patent Number: 5,036,896
[45] Date of Patent: * Aug. 6, 1991

[54] PNEUMATIC TIRE WITH ORIENTED CARCASS PLIES, THE PLIES HAVING ARAMID FILAMENTS

[75] Inventors: Thomas N. H. Welter, Keispelt, Luxembourg; John J. Slivka, Akron, Ohio

[73] Assignee: The Goodyear Tire & Rubber Company, Akron, Ohio

[*] Notice: The portion of the term of this patent subsequent to May 23, 2006 has been disclaimed.

[21] Appl. No.: 511,902

[22] Filed: Apr. 23, 1990

Related U.S. Application Data

[63] Continuation of Ser. No. 355,069, Apr. 14, 1988, abandoned, which is a continuation of Ser. No. 156,699, Feb. 17, 1988, abandoned.

[51] Int. Cl.$^5$ ............... B60C 9/26; B60C 9/04; B60C 9/00
[52] U.S. Cl. ................... 152/559; 152/527; 152/528; 152/543; 152/552; 152/556
[58] Field of Search .............. 152/561, 559, 451, 526, 152/527, 528, 529, 535, 536, 543, 548, 552, 553, 556, 560; 57/902, 237

[56] References Cited

U.S. PATENT DOCUMENTS

| | | | |
|---|---|---|---|
| 3,013,599 | 12/1961 | Riggs | 152/458 |
| 3,442,315 | 5/1969 | Mirtain | 152/561 X |
| 3,638,705 | 2/1972 | Devienne et al. | 152/542 |
| 3,977,172 | 8/1976 | Kerawalla | 57/237 |
| 4,024,901 | 5/1977 | Poqué | 150/ |
| 4,155,394 | 5/1979 | Shepherd et al. | 152/527 |
| 4,258,774 | 3/1981 | Mirtain et al. | 152/528 X |
| 4,445,560 | 5/1984 | Musy | 152/527 X |
| 4,469,157 | 9/1984 | Morikawa et al. | 152/561 X |
| 4,602,666 | 7/1986 | Kabe et al. | 152/527 |
| 4,657,058 | 4/1987 | Kabe et al. | 152/556 |
| 4,667,721 | 5/1987 | Cohen et al. | 152/543 |
| 4,715,420 | 12/1987 | Kabe et al. | 152/559 X |
| 4,716,951 | 1/1988 | Suzuki et al. | 152/561 X |
| 4,832,103 | 5/1989 | Slivka et al. | 152/559 |

FOREIGN PATENT DOCUMENTS

| | | |
|---|---|---|
| 0174147 | 3/1986 | European Pat. Off. ........... 152/552 |
| 1680780 | 9/1969 | Fed. Rep. of Germany . |
| 1964575 | 7/1970 | Fed. Rep. of Germany . |
| 7432386 | 1/1975 | Fed. Rep. of Germany . |
| 2590207 | 5/1987 | France . |
| 61-268505 | 11/1986 | Japan . |
| 2042429 | 9/1980 | United Kingdom . |

*Primary Examiner*—Caleb Weston
*Assistant Examiner*—Adrienne C. Johnstone
*Attorney, Agent, or Firm*—David L. King; Lonnie R. Drayer

[57] ABSTRACT

A radial ply pneumatic tire (10) has carcass plies (13,14,15) reinforced by cables comprising only yarns of aramid filaments, and belt plies (31–35) reinforced by cables comprising at least one yarn of aramid filaments twisted together with at least one yarn of nylon or polyester filaments. In a preferred embodiment which is suitable for use on an aircraft, there are both turn-up (13,14) and turn-down (15) carcass plies.

10 Claims, 6 Drawing Sheets

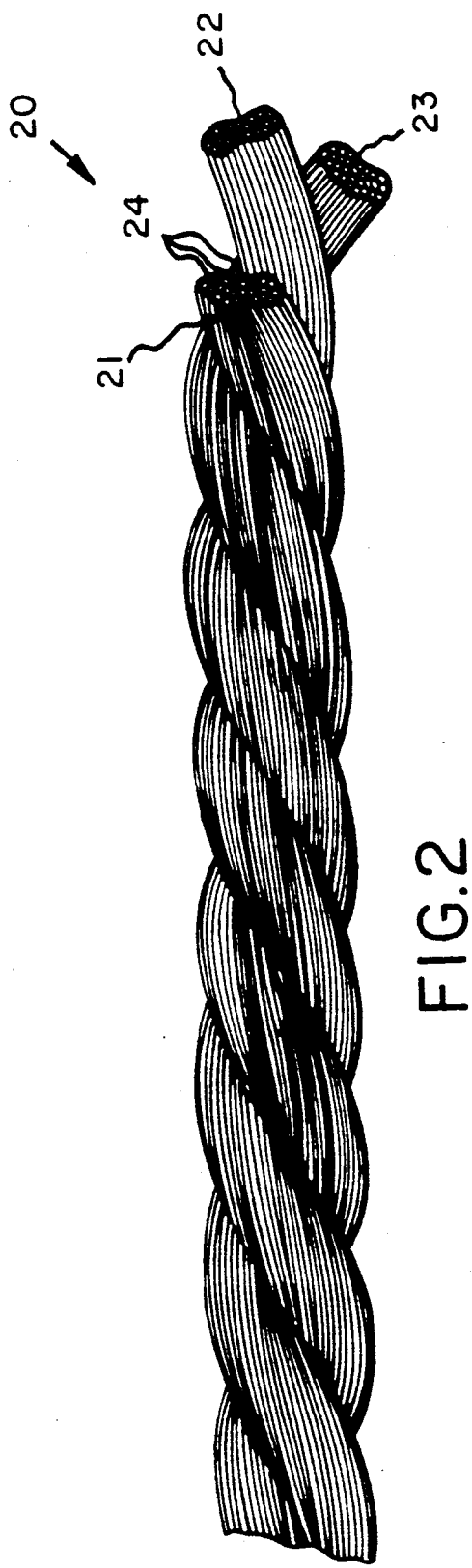
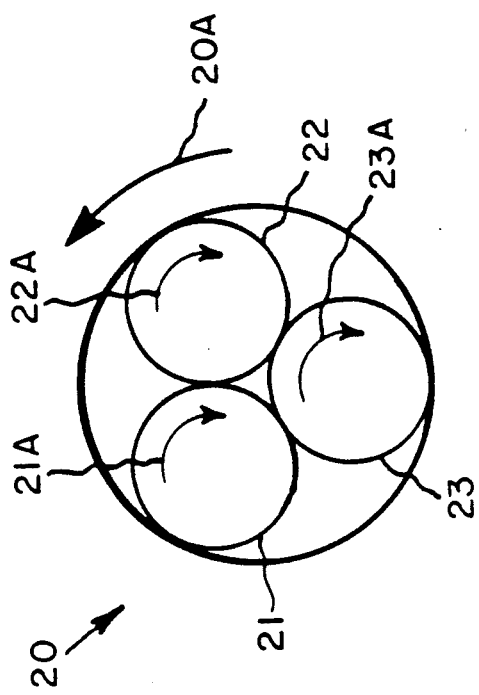
FIG.2
FIG.3

PNEUMATIC TIRE WITH ORIENTED CARCASS PLIES, THE PLIES HAVING ARAMID FILAMENTS

This is a continuation of application Ser. No. 07/355,069 filed on Apr. 14, 1989 now abandoned which is a continuation of application Ser. No. 07/156,699 filed on Feb. 17, 1988 now abandoned.

The present invention relates generally to pneumatic tires and more specifically to pneumatic tires suitable for use on aircraft.

It is generally recognized in the tire art that tires suitable for use on aircraft must be capable of operating under conditions of very high speeds and large loads as compared to tires used on automobiles, busses, trucks or similar earthbound vehicles. It is understood, however, that tires for such earthbound vehicles may advantageously be made in accordance with the broad aspects of the invention described herein. As used herein and in the claims, a tire is "suitable for use on an aircraft" if the tire is of a size and load range, or ply rating, specified in either the YEARBOOK OF THE TIRE AND RIM ASSOCIATION, or the YEARBOOK OF THE EUROPEAN TIRE AND RIM TECHNICAL ORGANIZATION, for the year in which the tire is manufactured, or in the current U.S.A. military specification "MIL-T-5041".

There is provided in accordance with one aspect of the invention a pneumatic tire comprising a carcass ply which has a plurality of cables oriented at 76° to 90° with respect to a mid-circumferential plane of the tire, each of said cables comprising two or more yarns twisted together with one another, and each said yarn consisting of a plurality of aramid filaments. The cables of the carcass plies have a twist multiplier in the range of 8 to 10 and a twist ratio in the range of 1 to 1.2. Two or more belt plies are disposed radially outwardly of the carcass plies in a crown region of the tire. Each of the belt plies has a plurality of cables and each of the cables of said belt plies comprises at least one yarn consisting of aramid filaments and one yarn consisting of either nylon or polyester filaments, and all of said yarns are twisted together with one another.

There is provided in accordance with another aspect of the invention a pneumatic tire suitable for use on an aircraft comprising a pair of axially spaced apart substantially inextensible annular bead cores. Two or more turn-up carcass plies extend between the bead cores, and each of the turn-up carcass plies is folded axially and radially outwardly about each of the bead cores. Each of the turn-up carcass plies comprises a plurality of cables oriented at 76° to 90° with respect to a mid-circumferential plane of the tire. Each of the cables of said turn-up carcass plies comprises two or more yarns that are twisted together with one another, each of said yarns consisting of a plurality of aramid filaments. The cables of said turn-up carcass plies have a twist multiplier in the range of 8 to 10 and a twist ratio in the range of 1 to 1.2. Two or more belt plies are disposed radially outwardly of the turn-up carcass plies in a crown region of the tire. Each of the belt plies has a plurality of cables and each of the cables in the belt plies comprises at least one yarn consisting of aramid filaments and at least one yarn consisting of either nylon or polyester filaments, all of said yarns being twisted together with one another.

There is provided in accordance with yet another aspect of the invention a pneumatic tire suitable for use on an aircraft comprising a pair of axially spaced apart substantially inextensible annular bead cores. Two or more turn-up carcass plies extend between the bead cores, and each of the turn-up carcass plies is folded axially and radially outwardly about each of the bead cores. Each of the turn-up carcass plies comprises two or more yarns that are twisted together with one another, and each of the yarns consists of a plurality of aramid filaments. The cables of the turn-up carcass plies have a twist ratio in the range of 1 to 1.2 and a twist multiplier in the range of 8 to 10. At least one turn-down carcass ply is disposed radially outwardly of the turn-up carcass plies. The turn-down carcass ply is folded radially and axially inwardly about each of the bead cores and the turn-up carcass plies. The turn-down carcass ply comprises cables that are oriented at 76° to 90°, with respect to the mid-circumferential plane of the tire. Each of the cables of the turn-down carcass ply comprises two or more yarns that are twisted together with one another. Each of said yarns consists of a plurality of aramid filaments, and the cables of the turn-down carcass ply have a twist ratio in the range of 1 to 1.2 and a twist multiplier in the range of 8 to 10. Two or more belt plies are disposed radially outwardly of all of the carcass plies in a crown region of the tire. One of the belt plies is folded and the remainder of the belt plies are unfolded. Each of the belt plies has a plurality of cables oriented at 10° to 20° with respect to the mid-circumferential plane of the tire. Each of the cables of said belt plies comprises two yarns consisting of aramid filaments and one yarn consisting of either nylon or polyester filaments and all of the yarns are twisted together with one another.

To acquaint persons skilled in the art with the principles of the invention, certain presently preferred embodiments illustrative of the best mode now contemplated for the practice of the invention are described herein making reference to the attached drawings forming a part of the specifications and in which drawings:

FIG. 2 is an enlarged view of an aramid cable suitable for use in a carcass ply of a tire according to the invention;

FIG. 3 is a diagrammatic representation of the concept of twist ratio;

Figure 1:
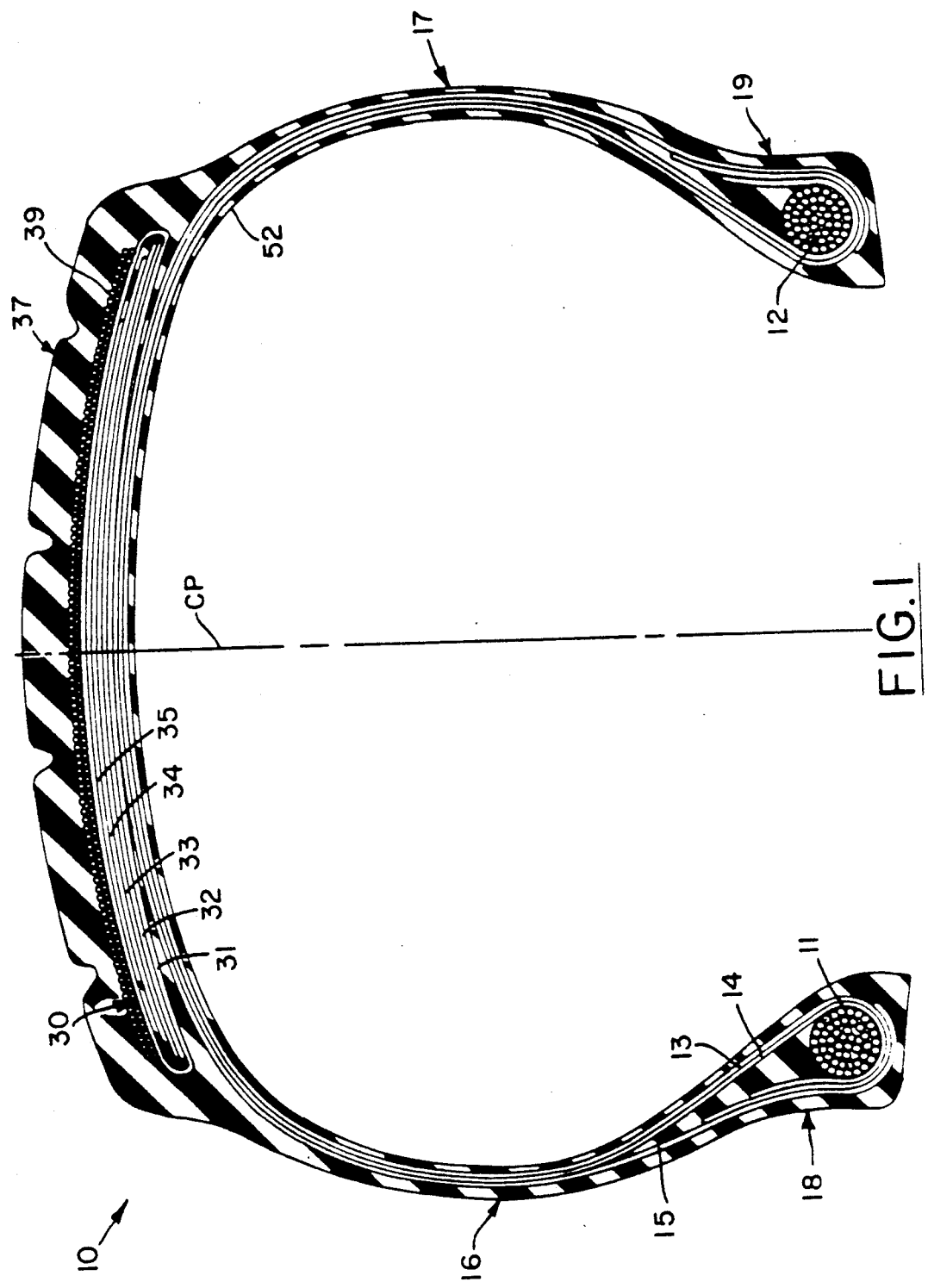
FIG. 1 is a cross-sectional view of a tire according to a preferred embodiment of the invention taken in a plane that contains the axis of rotation of the tire.
Figure 7:
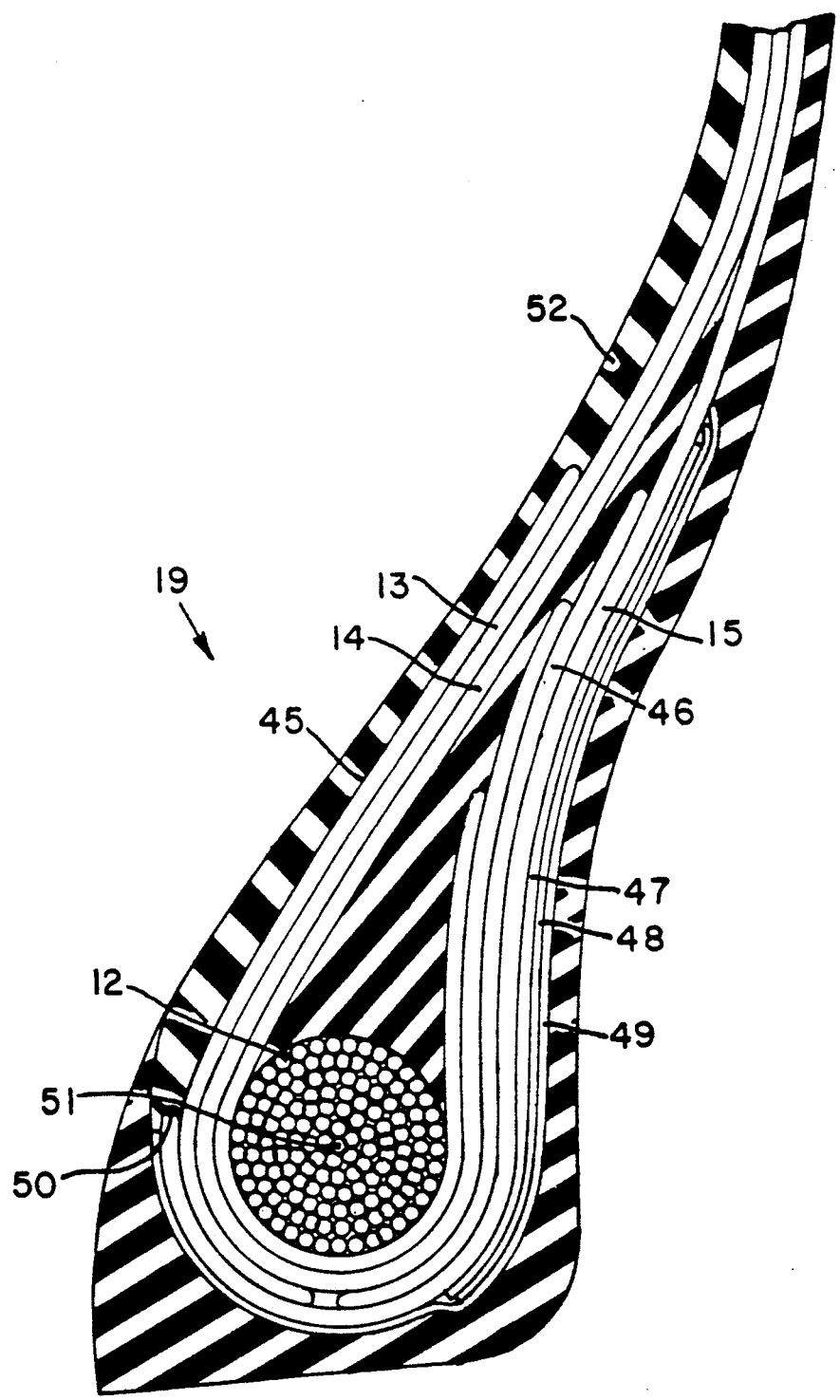
FIG. 7 is an enlarged fragmentary view of a bead portion of the tire illustrated in FIG. 1.

With reference to FIGS. 1 and 7, an aircraft tire 10 of size 46×16 R 20 according to a preferred embodiment of the invention has a pair of substantially inextensible annular bead cores 11,12 which are axially spaced apart with two or more carcass plies 13,14,15 extending between the bead cores.

As used herein and in the claims, the terms "axial" and "axially" refer to directions which are parallel to the axis of rotation of a tire, and the terms "radial" and "radially" refer to directions that are perpendicular to the axis of rotation of a tire. Each of the carcass plies 13,14,15 comprises a plurality of cables oriented at 76° to 90°, preferably 76° to 86°, with respect to a mid-circumferential plane (CP) of the tire. Put another way, a tire in accordance with the present invention is commonly referred to as a radial ply tire. As used herein and in the claims, the "mid-circumferential plane" of a tire is a plane that is perpendicular to the axis of rotation of the tire and is located midway between the sidewalls of a tire when the tire is not subjected to any load. In a preferred embodiment of the invention the carcass plies comprise two or more turn-up carcass plies 13,14 and at least one turn-down carcass ply 15. Each of the turn-up carcass plies 13,14 is folded axially and radially outwardly about each of the bead cores 11,12 and the turn-down carcass ply 15 is folded radially and axially inwardly about each of the bead cores 11,12 and the turn-up carcass plies 13,14. Preferably the turn-down carcass ply 15 is folded around the bead core 12 to such a degree that the edge 50 of said turn-down ply is axially outwardly of the midpoint 51 of the radial extent of the bead core 12.

Tires have been manufactured in which the cables of first turn-down carcass ply 13 were oriented at 78° with respect to the mid-circumferential plane CP, the cables of the second carcass ply 14 were oriented at 79° with respect to the mid-circumferential plane CP, and the cables of the third carcass ply 15 were oriented at 80° with respect to the mid-circumferential plane CP, all of the cables of all of the carcass plies being inclined in the same sense with respect to the mid-circumferential plane. It is believed that in preferred embodiments of the invention the orientation of the cables in each carcass ply should be nearer to 90° than the orientation of the cables of the radially next innermost ply and the included angles between the angles of radially adjacent carcass plies should not be greater than 10°, and preferably not greater than 2°.

If the tire is of the tubeless variety a substantially air impervious layer 52 is disposed inwardly of all of the carcass plies 13,14,15. Most preferably a barrier ply (not shown) is disposed between the air impervious layer 52 and the innermost carcass ply 13. The barrier ply functions to separate the air impervious layer from the elastomeric material in which the cables of the carcass ply 13 are embedded. Tires have been manufactured according to the invention having a barrier ply comprising cables of 840/1 nylon.

The cables of all of the carcass plies 13,14,15 are substantially the same, and an example of such a cable is shown in FIG. 2. Each of the cables 20 in the carcass plies comprises two or more yarns 21,22,23 that are twisted together. Each of the yarns 21,22,23 in the cables 20 of each of the carcass plies 13,14,15 consists of a plurality of aramid filaments 24. As used herein and in the claims, a yarn "consisting of", or which "consists of" aramid filaments is understood not to contain filaments of any material other than aramid.

As used herein and in the appended claims "aramid" is understood to mean a manufactured fiber in which the fiber forming substance is generally recognized as a long chain synthetic aromatic polyamide in which at least 85% of the amide linkages are attached directly to two aromatic rings. Representative of an aramid is a poly(p-phenyleneterephthalamide).

The cables 20 of all of the carcass plies 13,14,15 both turn-up and turn-down carcass plies, have a twist ratio in the range of 1 to 1.2 and a twist multiplier in the range of 8 to 10. The use of such aramid cables in a carcass ply of a tire is disclosed in commonly assigned U.S. patent application No. 061,364 filed on June 15, 1987.

The concept of "twist ratio" can be explained by referring to FIG. 3. In a cable 20 used in practicing the present invention, each of the yarns 21,22,23 has its component aramid filaments twisted together a given number of turns per unit of length of the yarn (typically, the unit of length is 2.54 cm or 1 inch) and the yarns are twisted together a given number of turns per unit of length of the cable. In the practice of the present invention, the yarn twist (as indicated by arrows 21A,22A,23A) and the cable twist (as indicated by arrow 20A) are opposite in direction. As used herein the direction of twist refers to the direction of slope of the spirals of a yarn or cable when it is held vertically. If the slope of the spirals conforms in direction to the slope of the letter "S", then the twist is called "S" or "left hand". If the slope of the spirals conforms to the slope of the letter "Z", then the slope is called "Z" or "right hand". If, for example only, as shown in FIG. 3, the filaments are twisted together to form yarns 21,22,23, each of which have nine turns per unit of length in the directions indicated by arrows 21A,22A and 23A and the yarns are then twisted together in the direction indicated by arrow 20A at eight turns per unit of length, the resultant cable will have a "twist ratio" of 9/8 or 1.125. It is understood that as used herein and in the appended claims, the term "twist ratio" means the ratio of the number of turns per unit of length imparted to the yarns before they are twisted together to form a cable to the number of turns per unit of length imparted to the yarns when twisting the yarns together to form a cable. If, for example only, with reference to FIG. 3, the filaments in the yarns 21,22,23 each have ten turns per unit of linear length imparted thereto in the direction indicated by arrows 21A,22A and 23A and then the yarns are twisted together in the direction indicated by arrow 20A at five turns per unit of linear length, then the resultant cable will have a twist ratio of 2.0. It is recognized in the art that a twist ratio of 2.0 yields what is referred to as a "0 torque" or "balanced" cable. In a cable which will be used in a carcass ply of a tire according to the invention, the twist ratio is in the range of 1.0 to 1.2.

Twist ratio is important because it affects the degree of off-balance in a cable, and therefore, the handling of the cable during the various steps of manufacturing a tire, such as fabric weaving and/or calendering, fabric cutting, and tire building.

Another important concept in cable used to reinforce pneumatic tires is "twist multiplier" which refers to a number that is an indicator of the helix angle that the yarns in a cable make with respect to a longitudinal axis of a cable. As used herein and in the claims, the twist multiplier of a cable is determined according to the following equation which is well known in the textile art:

$$TM = .0137\ CT \times \sqrt{CD}$$

wherein TM is the twist multiplier;
CT is the number of turns per 2.54 cm in the cable; and
CD is the sum of the deniers of the yarns of the cable before any twist is imparted to the yarns.

It is important to note that as used herein, all references to denier, of both yarns and cables, relate to the denier of a yarn, or yarns, before any twist is imparted to the yarn(s). Of course, when a twist is imparted to a yarn or cable, the actual weight per unit of length increases. "Denier" is understood to mean the weight in grams of 9,000 meters of a yarn before the yarn has any twist imparted thereto. For example, a 1500/3 cable comprises three yarns each of which has a denier of 1500 before any twist at all is imparted thereto, such that the cable denier (CD) is 4500.

Twist multiplier is an important characteristic of an aramid cable because a low twist multiplier gives high original tensile strength with low bending strength, while a higher twist multiplier gives better residual strength and better bending strength.

It has been found that the handling of the cables after the twisting operations are completed can be enhanced by using the lowest practical tension on the cables during the step of applying an adhesive coating (sometimes referred to as a "dip") to the cable. A tension of 0.5 to 2.0 kg (1to 2 lbs.) per cable was found to work quite satisfactorily.

Table I shows the effect on breaking strength and fatigue in a 1500/3 aramid cable of various twist multipliers (properties given are for dipped cables). The Mallory Test referred to in Table I refers to a well known test in which the cables being tested are subjected to cycles of tension and compression, and the number of cycles until failure is an indication of the fatigue characteristics of the cable.

TABLE I

| Twist Multiplier | Yarn × Cable Twist (turns/2.54 cm) | Twist Ratio | Break Strength (Kg) | Average Fatigue Life (Kilocycles) (Mallory Fatigue Test) |
|---|---|---|---|---|
| 3.7 | 4 × 4 | 1.0 | 66.7 | 14 |
| 5.9 | 6 × 6.4 | 0.9 | 76.9 | 8 |
| 6.3 | 6.9 × 6.9 | 1.0 | 77.8 | 19 |
| 7.7 | 10 × 8.4 | 1.2 | 70.2 | 628 |
| 9.2 | 8.4 × 10 | 0.8 | 72.3 | 1193 |
| 9.6 | 10 × 10.4 | 0.96 | 67.6 | 1193 |
| 11.0 | 12 × 12 | 1.0 | 57.1 | 1200 |
| 12.9 | 14 × 14 | 1.0 | 41.0 | 823 |

Figure 4:
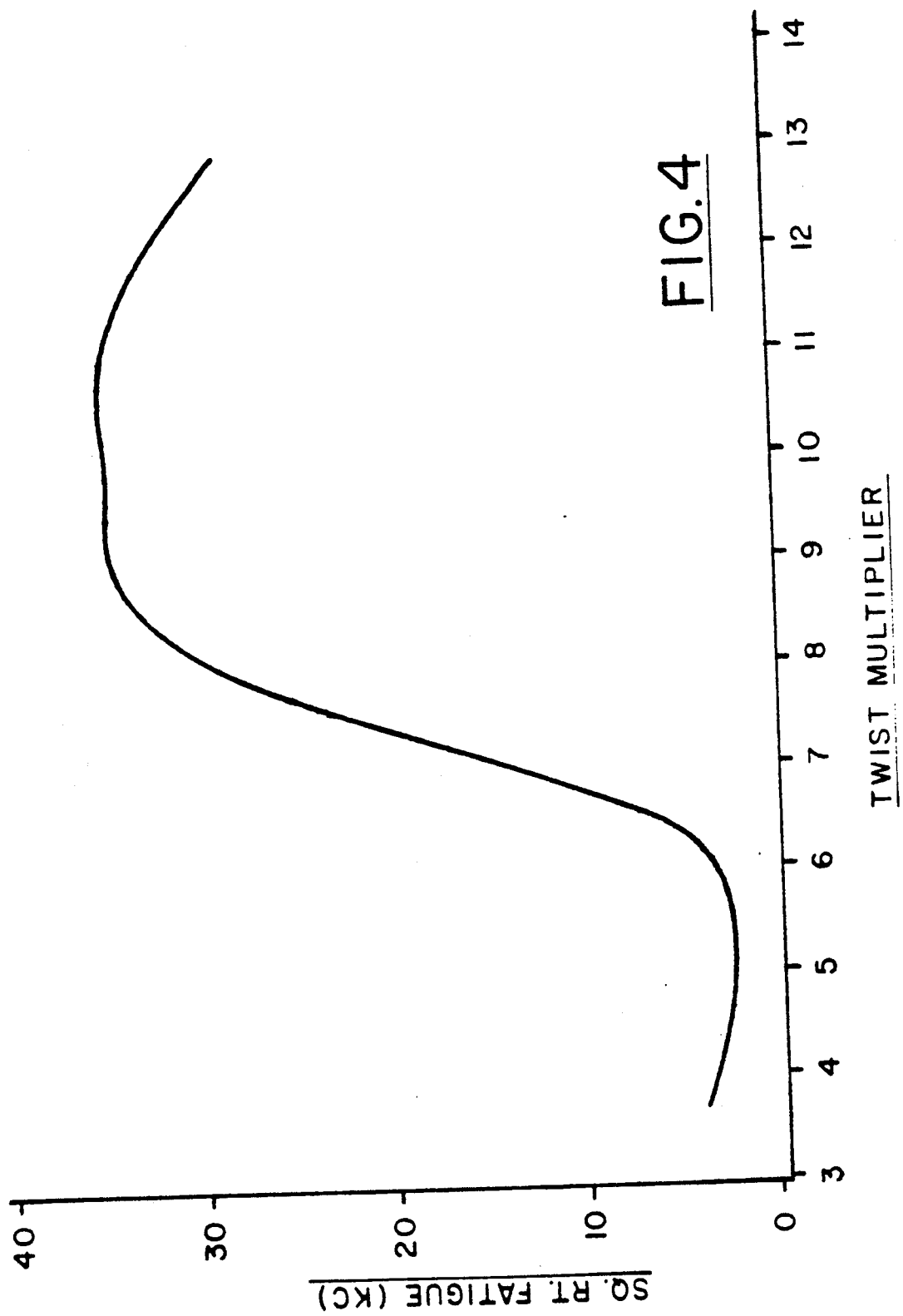
FIG. 4 is a graph of cable fatigue performance as a function of twist multiplier for an aramid cable.

FIG. 4 is a graph based upon the data in Table I showing the square root of the average fatigue life in kilocycles of various cable structures as a function of the twist multiplier. (The square roots of the fatigue lifes are used in order to have a more convenient scale on the graph.) For twist multipliers in the range of 7 to 8, the graph have a very steep slope, and a very small deviation in the twist structure of a cable can have a very significant effect upon the durability of a tire containing the cable. In view of the inconsistencies that exist in currently used cable manufacturing processes, it is felt that twist multipliers in the range of 7 to 8 should be avoided regardless of whether the cable is intended for use in a belt ply or a carcass ply. It has been further noted that in cables having a twist multiplier greater than about 9, there can be kinking of the cables during manufacturing and this kinking problem can be controlled by using an appropriate twist ratio. It can be theorized, although it has not yet been proven, that in the past this same kinking problem occurred in tires during use and resulted in what was called a compression fatigue failure.

Figure 5:
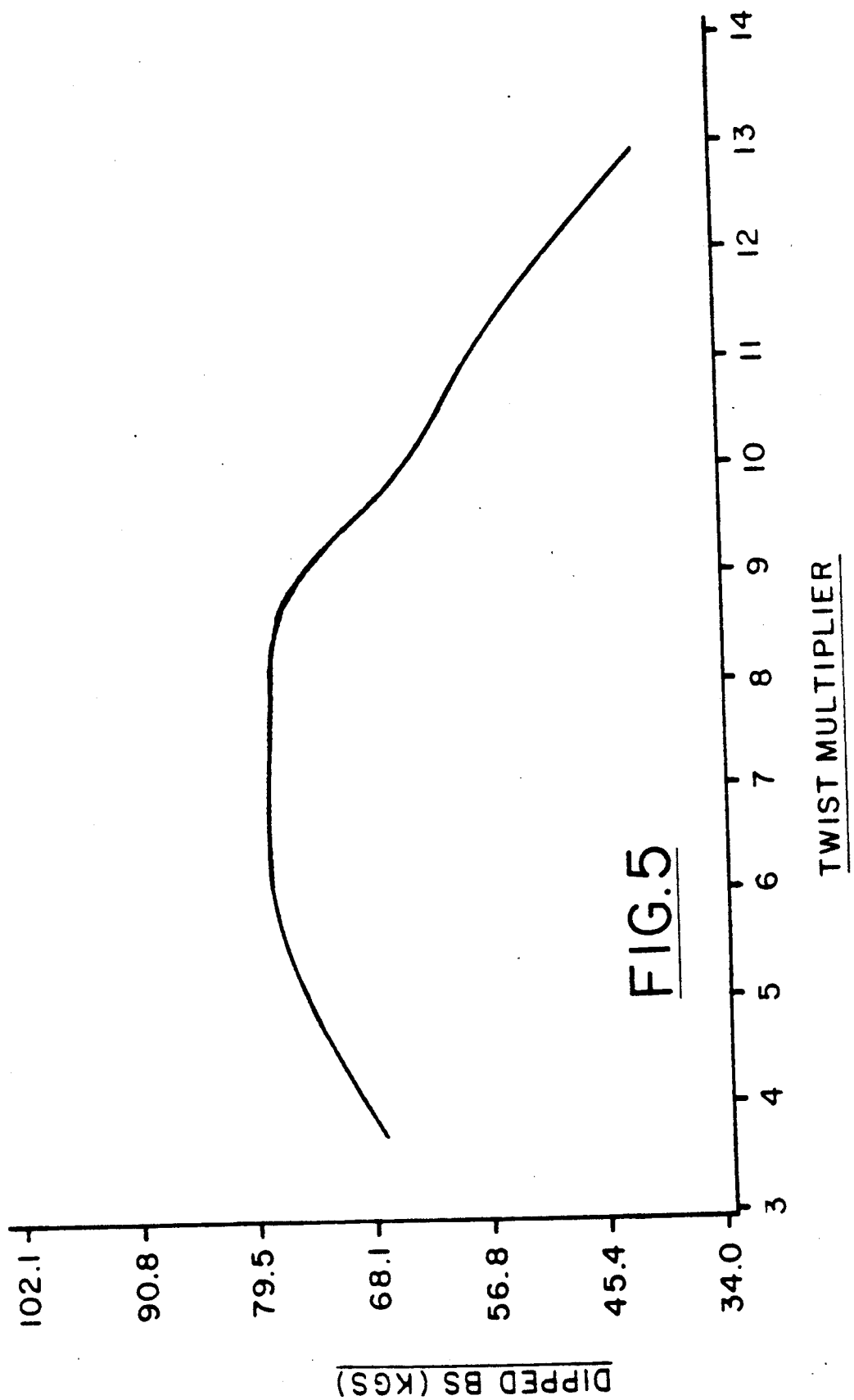
FIG. 5 is a graph of cable breaking strength as a function of twist multiplier for an aramid cable.

FIG. 5 is a graph showing the breaking strength BS of various cable structures in Table I as a function of the twist multiplier.

In the practice of the present invention, it is necessary to use an aramid cable with construction features that yield desired mechanical characteristics to the carcass plies 13,14,15 of a tire. If a cable is to be used as a reinforcing element in a carcass ply of a tire, then its fatigue characteristics are very important because the sidewalls 16,17 of a radial ply tire go through cycles of tension and compression. As shown in FIG. 4, a twist multiplier in the range of 8 to 12 will result in an aramid cable having good fatigue characteristics. Accordingly, tires have been manufactured according to the preferred embodiment in which the cables of the carcass plies had a twist multiplier of 9 and a twist ratio of 1.0–1.2. In said tires, there were about 4 to 5 cables per cm of width of the ply.

It is important to note aramid cables with the twist multipliers used in carcass plies according to the invention will not have the maximum possible breaking strength BS, as is evident from FIG. 5, but it is believed that the useful strength of the cables will be larger throughout the tire life due to the good fatigue characteristics of the cables.

A belt structure 30 comprising two or more belt plies 31–35 is disposed radially outwardly of all of the carcass plies 13,14,15 in a crown region of the tire. A ground engaging tread portion 37 is disposed radially outwardly of the belt structure 30, and a sidewall portion 16,17 extends radially inwardly from each axial edge of the tread portion to a respective bead portion 18,19. In the preferred embodiment illustrated in FIG. 1 one of the belt plies 31 is folded therein and the remainder of the belt plies 32–35 are unfolded. Each of the belt plies comprises a plurality of cables oriented at 10° to 20° with respect to a mid-circumferential plane CP of the tire. Tires have been manufactured according to this preferred embodiment with the cables of the folded belt ply 31 oriented at 16° with respect to the mid-circumferential plane CP and the cables of the unfolded belt plies 31–35 oriented at 14° with respect to the mid-circumferential plane CP. One or more wraps 39 of a restricting band of nylon cords oriented at 0° to 25° with respect to the mid-circumferential plane CP is interposed between the belt structure 30 and the tread portion 37.

It is understood that the particular belt structure illustrated in FIG. 1 and described herein is merely an example used in a preferred embodiment and that a tire designer may employ any arrangement of folded or unfolded belt plies in accordance with the performance requirements of a particular tire while still practicing the present invention.

Figure 6:
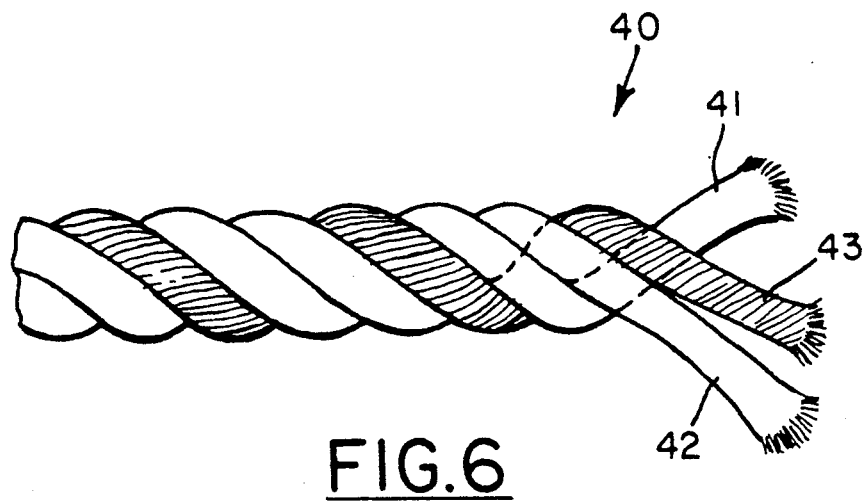
FIG. 6 is an enlarged view of a cable suitable for use in a belt ply of a tire according to the invention.

In a tire according to a preferred embodiment of the invention each of the belt plies 31–35 comprises cables 40 having (as shown in FIG. 6) at least one yarn 41,42 consisting of aramid filaments and at least one yarn 43 consisting of either nylon or polyester filaments with all of said yarns being twisted together with one another. U.S. Pat. No. 4,155,394 describes cables of the type suitable for use in the practice of the present invention. Cables of this type are desirable in the belt plies of tires which are subjected to extraordinary levels of deflection (such as aircraft tires), because these cables can better dissipate the energy encompassed in the tire as the belt structure passes through the tire footprint, that is to say, the belt structure has to support the deformations required to carry the load placed on the tire. It would take about twice as many nylon cables of the same diameter to provide comparable strength and that would require undesirably thick belt structures. Cables comprising only aramid filaments provide adequate strength but do not have the desired energy dissipating characteristics for high deflection applications.

Tires have been manufactured according to the preferred embodiment of the invention with belt plies 31–35 having cables comprising two yarns each consisting of 3,000 denier aramid and one yarn consisting of 1,890/2 denier nylon. The aramid yarns each had a twist of 6.7/25 mm in a Z direction and the nylon yarn had a twist of 4.5/25 mm in a Z direction. All of the yarns were twisted together with one another at 6.7/25 mm in an S direction. In this particular example the nylon yarn has a yarn/cable twist ratio of 0.67, the aramid yarns have a yarn/cable twist ratio of 1.0 and the twist multiplier of the cable as a whole is 8.15. Of course, a tire designer must select the proper twist, number of yarns and yarn denier in accordance with the performance requirements of a given tire.

The disposition of reinforcing strips of nylon cords in the bead portions of tires according to the preferred embodiment is believed to contribute to the product performance. In a preferred embodiment of the invention having both turn-up carcass plies 13,14 and at least one turn-down carcass ply 15 there are several reinforcing strips of nylon cords disposed in each bead portion 18,19.

The arrangement of the reinforcing strips can best be described by referring to FIG. 7, which is an enlarged fragmentary view of a bead portion 19 of the tire illustrated in FIG. 1. At least one reinforcing strip 45,46 of nylon cables is folded about each of the bead cores 12 and the turn-up carcass plies 13,14 such that at least a portion of each of the reinforcing strips 45,46 is interposed between the radially innermost carcass ply 13 and the turn-down carcass ply 15. Preferably, the radially outermost edges of each of these first reinforcing strips 45,46 are disposed radially outwardly of the axial edges of all of the turn-up carcass plies. If desired, a single strip of nylon cords could be substituted for the two strips 45,46 so long as it is disposed in substantially the same manner. Put another way, at least one reinforcing strip 45,46 of nylon cables is folded about each bead core 11,12 such that it is interposed between the radially innermost turn-up carcass ply 13 and the turn-down carcass ply 15.

Most preferably at least one reinforcing strip 47,48,49 of nylon cords is disposed such that the portion of the turn-down carcass ply 15 which is folded about and disposed radially inwardly of the bead core 12 is interposed between nylon reinforcing strips 45,46,47. The nylon cables of the reinforcing strips 45–49 should be disposed at angles of not more than 30° with respect to circumferential lines of the tire, preferably at 25° to 30°.

While certain representative embodiments and details have been shown for the purpose of illustrating the invention, it will be apparent to those skilled in the art that various changes and modifications may be made therein without departing from the spirit or scope of the invention.

I claim:

1. A pneumatic tire comprising:
   (a) a plurality of carcass plies which each comprise a plurality of cables oriented at 76° to 90° with respect to a mid-circumferential plane of the tire, for each pair of radially adjacent carcass plies the cables of the radially outermost carcass ply of the pair are oriented nearer to 90° with respect to said mid-circumferential plane than the cables of the radially innermost carcass ply of the pair and the included angles between the cables of the carcass plies of said pair is not greater than 10°, each cable of said carcass plies comprising two or more yarns twisted together with one another, each of said yarns consists of a plurality of aramid filaments, the cables of said carcass plies having a twist multiplier in the range of 8 to 10 and a twist ratio in the range of 1 to 1.2; and
   (b) two or more belt plies disposed radially outwardly of said carcass plies in a crown region of the tire, each of said belt plies comprising a plurality of cables wherein each said cable comprises a plurality of yarns twisted together with one another, at least one of said yarns consisting of a material selected from the group consisting of nylon and polyester filaments.

2. A pneumatic tire according to claim 1 wherein said tire comprises three of said carcass plies, the two axially innermost carcass plies each having a pair of axial edge portions each of which are folded axially and radially outwardly about an annular bead, the third carcass ply having a pair of edge portions each of which is folded axially inwardly about the first two carcass plies and an annular bead.

3. A pneumatic tire according to either one of claims 1 or 2 wherein one of said belt plies has folds therein and the remainder of the belt plies are unfolded.

4. A pneumatic tire according to either one of claims 1 or 2 wherein the cables in said belt plies each comprises two yarns consisting of said aramid filaments and one yarn consisting of nylon filaments.

5. A pneumatic tire according to claim 3 wherein the cables in said belt plies each comprises two yarns consisting of aramid filaments and one yarn consisting of nylon filaments.

6. A pneumatic tire suitable fur use on an aircraft comprising:
   (a) a pair of axially spaced apart substantially inextensible annular bead cores;
   (b) two or more turn-up carcass plies extending between the bead cores, each of said turn-up carcass plies being folded axially and radially outwardly about each said bead core, each of said carcass plies comprising a plurality of cables oriented at 76° to 86° with respect to a mid-circumferential plane of the tire, for each pair of radially adjacent carcass plies the cables of the radially outermost carcass ply of the pair are oriented nearer to 90° with respect to said mid-circumferential plane than the cables of the radially innermost carcass ply of the pair and the included angles between the cables of the carcass plies of said pair is not greater than 10°, each of said cables of the turn-up carcass plies comprising two or more yarns that are twisted together with one another, each of said yarns consisting of a plurality of aramid filaments, the cables of said turn-up carcass plies having a twist multiplier in the range of 8 to 10 and a twist ratio in the range of 1 to 1.2; and
   (c two or more belt plies disposed radially outwardly of said turn-up carcass plies in a crown region of the tire, each of said belt plies comprising a plurality of cables wherein each said cable comprises a plurality of yarns twisted together with one another, at least one of said yarns consisting of aramid filaments and at least one of said yarns consisting of a material selected from the group consisting of nylon and polyester filaments.

7. A pneumatic tire suitable for use on an aircraft according to claim 6 further comprising a turn-down carcass ply radially interposed between the turn-up carcass plies and the belt plies; said turn-down carcass ply being folded radially and axially inwardly about each of said bead cores, said turn-down carcass ply comprising cables that are substantially the same as the cables of said turn-up carcass plies and are oriented at 78° to 86° with respect to the mid-circumferential plane of the tire.

8. A pneumatic tire suitable for use on an aircraft according to either claim 6 or 7, wherein the cables in said belt plies each comprises two yarns consisting of aramid filaments and one yarn consisting of nylon.

9. A pneumatic tire suitable for use on and aircraft comprising:
  (a) a pair of axially spaced apart substantially inextensible annular bead cores;
  (b) two or more turn-up carcass plies extending between the bead cores, each of said turn-up carcass plies being folded axially and radially outwardly about each of said bead cores, each of said turn-up carcass plies comprising a plurality of cables oriented at 76° to 86° with respect to a mid-circumferential plane of the tire, each of said cables comprising two or more yarns that are twisted together with one another, each of said yarns consisting of a plurality of aramid filaments, the cables of said turn-up carcass plies having a twist ratio in the range of 1 to 1.2 and a twist multiplier in the range of 8 to 10;
  (c) At least one turn-down carcass ply disposed radially outwardly of the return-up carcass plies, said turn-down carcass ply being folded radially and axially inwardly about each of said bead cores and said turn-up carcass plies, said turn-down carcass ply comprising cables that are oriented at 78° to 90° with respect to the mid-circumferential plane of the tire, each of said cables of said turn-down carcass ply comprising two or more yarns that are twisted together with one another, each of said yarns consisting of a plurality of aramid filaments, the cables of said turn-down carcass ply having a twist ratio in the range of 1 to 1.2 and a twist multiplies in the range of 8 to 10, for each pair of radially adjacent carcass plies the cables of the radially outermost carcass ply are oriented nearer to 90° with respect to said mid-circumferential plane than the cables of the radially innermost carcass ply of the pair and the included angles between the cables of the carcass plies of said pair is not greater than 10°; and
  (d) tow or more belt plies disposed radially outwardly of all of said carcass plies in a crown region of the tire, one of said belt plies having folds therein and the remainder of said belt plies being unfolded, each of said belt plies comprising a plurality of cables oriented at 10° to 20° with respect to the mid-circumferential plane of the tire, each of the cables of said belt plies comprising a plurality of yarns twisted together with one another, at least one of said yarns consisting of aramid filaments and at least one of said yarns consisting of at least one material selected from the group consisting of nylon and polyester filaments.

10. A pneumatic tire according to claim 9 further comprising a plurality of strips of nylon cables disposed in each bead portion of the tire such that the portion of turn-down carcass ply which is folded about and disposed radially inwardly of the bead core is interposed between strips of nylon cables.

* * * * *